Feb. 23, 1960 V. L. PEICKII ET AL 2,926,035
PRESSURE SHAFT SEAL
Filed Dec. 22, 1958

United States Patent Office 2,926,035
Patented Feb. 23, 1960

2,926,035

PRESSURE SHAFT SEAL

Vasalie L. Peickii, Hillsborough, and Dan A. Christensen, Menlo Park, Calif., assignors to Federal-Mogul-Bower Bearings, Inc., Detroit, Mich., a corporation of Michigan Application December 22, 1958, Serial No. 782,050

5 Claims. (Cl. 288—3)

This invention relates to improvements in radial shaft seals, and particularly to seals that must operate under pressure conditions.

Normally, radial shaft seals are designed to work under very low fluid-pressure conditions, and where any substantial fluid pressure is involved, face seals are used. However, sometimes face seals cannot be used because there is not enough space for their installation, and at other times face seals are too expensive to be economically practical. The seal of the present invention is not a face seal but it is applicable to medium-pressure conditions, and, in some instances, can be used under severe pressure conditions. It is generally less expensive, consumes less space, and is easier to install than a face seal. It is versatile and can be used in many other installations where face seals heretofore have been used.

The seal of this invention may be used in automotive, hydraulic, and oil pumps and in other types of rotating pumps where exceedingly high temperatures and pressures do not exclude the use of synthetic elastomer sealing members. These uses are usually beyond the capacity of conventional shaft seals with their inherent sensitivity to pressures above a few p.s.i.

Thus, one object of the invention is to provide a radial shaft seal suitable for use under pressure conditions such as where the fluid pressure is in the range of 10 to 40 p.s.i.

Another object of the invention is to provide a shaft sealing member able to withstand deformation without functional destruction of the pressure balance on the lip, and without enough distortion of the lip itself to cause leakage, as because of approach angle changes, excessive widening of the contact surface, and so forth.

Another object of the invention is to provide a seal having a pressure-balanced design, so that the pressure tending to lift the lip off the sealing surface is balanced by pressure tending to hold the lip on the sealing surface.

Other objects and advantages of the invention will appear from the following description of some preferred embodiments thereof.

Figure 1:
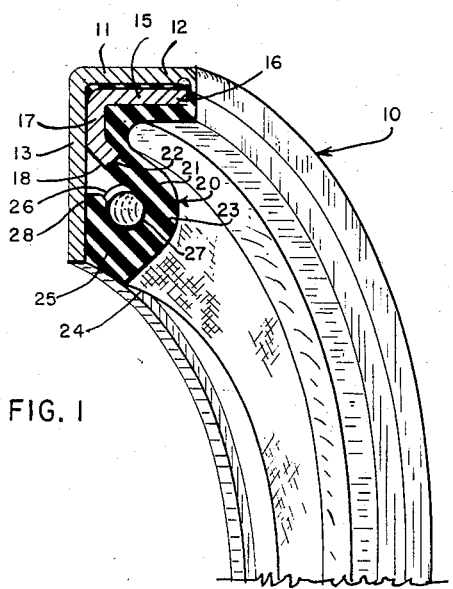
Fig. 1 is a view in perspective and partly in section of a shaft seal embodying the principles of the invention.
Figure 2:
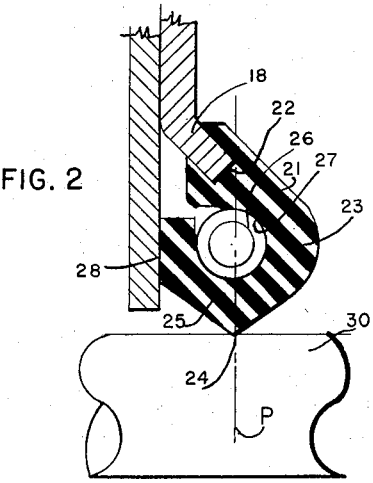
Fig. 2 is an enlarged fragmentary view in elevation and in section of a portion of the seal of Fig. 1.

The seal 10 shown in Figs. 1 and 2 has an outer case 11 with an axial flange 12 and a radial flange 13. The seal also has an inner case 15 with an axial flange 16 and a radial flange 17. The inner rim 18 of the radial flange 17 is preferably turned axially away from the flange 13. Bonded to the inner case 15 is a sealing element 20 made of elastomeric material. Preferably the bond is like that described and claimed in the patent application by Robert N. Haynie, Serial No. 639,276, filed February 11, 1957, but the sealing element may be bonded otherwise. A portion 21 of the sealing element 20 extends out beyond the end 22 of the rim 18 to provide an enlarged lip portion 23 which terminates at a radially inward point in a sealing lip 24.

The lip portion 23 includes a portion 25 extending from the lip 24 toward the radial flange 13. For many installations a garter spring 26 is essential to increase the runout limits and to insure sealing at low or zero pressure when the flattening or sealing effect due to fluid pressure is absent, or where wear or permanent set have affected the inner periphery of the lip 24. In such cases a groove 27 may be provided for seating the garter spring 26 substantially radially in line with the sealing lip 24.

It will be noted that in this design, the sealing lip 24 is substantially radially in line with the rim 22 of the reinforcing inner case 15. The spring 26, if not actually in this line with the rim 22 and lip 24, is slightly to the side on which the portion 21 lies.

Preferably, the lip 24 is molded to shape to avoid any difficulty in trimming and to obtain more control over the critical dimensions.

The radial flange 13 of the outer case 11 extends down beyond the radial flange 17 of the inner case 15 and acts as a guard member to prevent the sealing element 20 from being forced out beyond a certain location. For this purpose, the sealing element 20 is provided with a limit or bumper portion 28.

Thus, the seal 10 includes a sealing member 20 bonded to a supporting case 15 with a garter spring 26 in radial alignment with the lip 24 and the rim 22 of the supporting case 15, while an outer case 11 includes means for limiting the axial displacement of the sealing member 20 under pressure operating on a sealing side of the sealing lip 24.

When made according to the above illustrative description, the sealing member 20 is so proportioned that there is an approximate pressure balance between the lip 24 and the point 22 of attachment of the sealing element 20 to the reinforcing member 15. This balance acts in the plane P of the lip 24 and the rim end 22, or parallel to it. Since the projected area of the upper part of the sealing element 20 to the right of the point 22 of attachment and the projected area of the contact surface to the right are equal, and since the pressure is uniform, the force tending to press the seal down on the shaft 30 is equal to the force tending to lift the sealing lip 24 off the shaft 30. Because of this pressure-balanced design, deformation of the sealing element 20 under pressure does not lead to the functional destruction of the pressure balance, or to distortion of the lip 24 sufficient to cause leakage. Approach angle changes are avoided, as are excessive widening of the contact surfaces.

Various sealing materials may be used, such as synthetic rubber, or plastic, or other elastomers, or leather, or other materials of suitable characteristics for the particular operating environment concerned. The flexibility of the sealing member 20 to accommodate runout may be increased in several ways, such as by attaching it to the case 15 at a greater radial distance from the shaft than is illustrated. However, it still should remain with the point 22 of attachment in substantially the same plane as the lip 24. The sealing member 20 may be attached to the case structure by bonding, clamping, or by any other suitable means.

Figure 3:
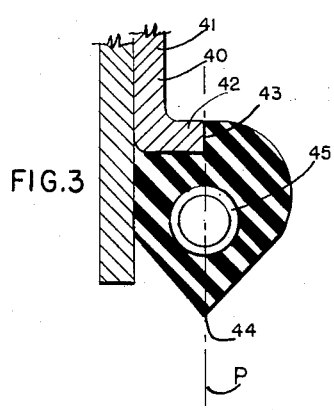
Fig. 3 is a view similar to Fig. 2 of a modified form of seal also embodying the invention.

Modifications of the invention are feasible. As shown in Fig. 3, it is feasible to use an inner case 40 in which a radial flange 41 terminates with a directly axial portion 42 whose rim 43 directly overlies the sealing lip 44. Fig. 3 also shows an example of a molded-in spring member 45. However, it should be noted again that the spring 45 is substantially in line with or just barely outside the plane of the sealing lip 44, which is also the plane P at which the reinforcing case member 42 ends.

Figure 4:
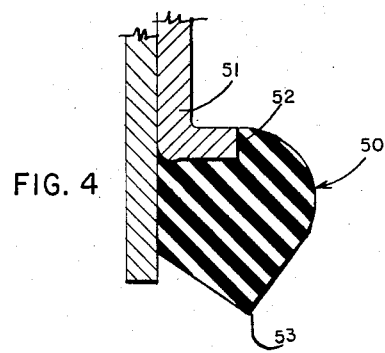
Fig. 4 is a view similar to Fig. 3 of still another modified form of seal embodying the invention.

For some uses in which there are no zero pressure conditions or where otherwise a spring is not required, a seal 50 may be made as in Fig. 4. Here again the point of attachment 52 of the reinforcing member 51, i.e., the point at which the reinforcing member terminates, is in the same plane as the sealing lip edge 53. In this instance, the sealing lip portion 53, is made solid to give it considerable strength, but if more flexibility is needed for some lower pressure conditions, the obvious expedient of thinning the lip portion at this part can be employed.

Tests have been performed on seals like those of Fig. 1, and they have been found to operate under pressure conditions up to 175 p.s.i., although normal operating conditions to which the seal is better adapted would be in the range of 40 p.s.i.

To those skilled in the art to which this invention relates, many additional changes in construction and widely differing embodiments of the invention will suggest themselves without departing from the spirit and scope of the invention as defined in the claims.

What is claimed is:

1. A radial shaft seal including, in combination, an outer case with a first radial flange; an inner case secured within said outer case and having a second radial flange closely adjacent said first radial flange but with a terminal portion extending away from said first radial flange and ending in a rim; a resilient sealing member secured to said inner case at surfaces including said rim, said sealing member having a sealing lip at its radially inward periphery substantially radially in line with said rim, said sealing element having a bumper surface facing said radial flange of said outer case, said outer case radial flange extending radially inwardly into close proximity to said sealing member so as to be engageable by said bumper surface to prevent said sealing member from being forced axially beyond a predetermined distance and thereby holding said lip substantially in said plane.

2. The seal of claim 1 having a garter spring engaging said sealing element substantially in line radially with said rim and said lip and urging said lip radially inwardly.

3. A radial type of shaft seal including, in combination, an outer case with an axial flange adapted to be seated in a cylindrical bore and a radial flange; an inner case secured within said outer case with a radial flange abutting the radial flange of said outer case but with a terminal portion extending axially away from the radial flange of said outer case and ending in a rim; a resilient sealing member secured to said inner case at points including said rim, said sealing member having a sealing lip at its radially inward periphery for sealing on a shaft member that rotates relatively to said bore, said lip being substantially radially in line with said rim, said sealing element having a bumper surface facing said radial flange of said outer case, which extends radially inwardly into close proximity to said bumper surface, so as to prevent said sealing member from being forced axially beyond a predetermined distance and thereby holding said lip substantially in said plane.

4. In a radial shaft seal having an outer case with a radial flange, the combination therewith of an inner case secured to said outer case and having a radial flange closely adjacent the radial flange of said outer case but with a terminal portion extending away from the radial flange of said outer case and ending in a peripheral edge; and a resilient sealing member secured to said inner case at points including said edge and having a sealing lip at its radially inner periphery substantially radially in line with said edge and having a bumper surface facing said outer case radial flange, which extends radially inwardly into close proximity to said sealing member, so as to prevent said lip from being forced axially beyond a predetermined distance, said sealing member having a body with a portion extending axially beyond said edge and away from said radial flanges, said portion having a surface area on a radially outer side substantially equal to a surface area on a radially inner side of the same portion, so as to balance fluid pressure tending to force said lip radially inwardly with the fluid pressure tending to force it radially outwardly.

5. In a radial type of shaft seal having an outer case with a radial flange, the combination therewith of an inner case secured to said outer case and having a radial flange resting against the radial flange of said outer case but with a terminal portion extending away from the radial flange of said outer case and ending in a peripheral edge; a resilient sealing member secured to the surface of said inner case at loci including said edge and having a sealing lip at its radially inner periphery substantially in line radially with said edge and having a bumper surface facing said outer case radial flange, said outer case radial flange extending radially inwardly into close proximity to said sealing member, so as to prevent said lip from being forced axially beyond a predetermined distance; and spring means centered approximately radially in line with said lip, to insure shaft interference of said sealing lip, said sealing member having a body portion extending axially beyond said edge and away from said radial flanges with a surface area on a radially outer side substantially equal to a surface area on a radially inner side, so as to balance the fluid pressure tending to force said lip radially inwardly with the fluid pressure tending to force it radially outwardly.

No references cited.